United States Patent [19]

Nikolaus et al.

[11] Patent Number: 5,343,779
[45] Date of Patent: Sep. 6, 1994

[54] ARRANGEMENT AND PROCESS FOR OPERATING A FAIL SAFE BRAKING SYSTEM IN A CONTINUOUSLY VARIABLE DRIVING UNIT OF A MOTOR VEHICLE

[75] Inventors: Heinrich Nikolaus, Hamburg; Robert Paton, Passau, both of Fed. Rep. of Germany

[73] Assignee: Zahnradfabrik Friedrichshafen AG, Fed. Rep. of Germany

[21] Appl. No.: 778,846

[22] PCT Filed: Jul. 7, 1990

[86] PCT No.: PCT/EP90/01106

§ 371 Date: Dec. 19, 1991

§ 102(e) Date: Dec. 19, 1991

[87] PCT Pub. No.: WO91/01461

PCT Pub. Date: Feb. 7, 1991

[30] Foreign Application Priority Data

Jul. 14, 1989 [DE] Fed. Rep. of Germany ....... 3923218

[51] Int. Cl.$^5$ .................... F16H 47/04; F16H 61/12
[52] U.S. Cl. .................... 74/733.1; 192/4 A; 475/81
[58] Field of Search .............. 192/8 R, 4 A, 0.049, 192/0.072, 0.09; 74/730.1, 732.1, 733.1; 475/72, 81, 82

[56] References Cited

U.S. PATENT DOCUMENTS

| | | | |
|---|---|---|---|
| 4,884,669 | 12/1989 | Ehrhyer | 192/0.09 X |
| 4,893,879 | 1/1990 | Middlehoven et al. | 192/4 A X |
| 4,989,703 | 2/1991 | Forsyth et al. | 192/4 A |
| 5,009,126 | 4/1991 | Meisinger et al. | 74/733.1 |
| 5,080,637 | 1/1992 | Temberge et al. | 475/72 X |
| 5,135,443 | 8/1992 | Paton et al. | 475/81 |
| 5,193,416 | 3/1993 | Kanayama | 74/732.1 X |
| 5,222,921 | 6/1993 | Garcia | 475/72 |

FOREIGN PATENT DOCUMENTS

| | | |
|---|---|---|
| 0243022 | 10/1987 | European Pat. Off. |
| 0314409 | 5/1989 | European Pat. Off. |
| 3512523 | 9/1986 | Fed. Rep. of Germany |
| 3836421 | 5/1989 | Fed. Rep. of Germany |
| 2651292 | 3/1991 | France ............... 74/733.1 |

*Primary Examiner*—Leslie A. Braun
*Assistant Examiner*—Khoi Ta
*Attorney, Agent, or Firm*—Davis, Bujold & Streck

[57] ABSTRACT

An arrangement and process for operating a continuously variable drive unit of a motor vehicle having an apparatus for control of the operation of the clutches (25, 26) in the mechanical transmission branch (19). Sensors (7, 9, 45) transmit the speed of the mechanical transmission branch (19), the hydrostatic transmission branch (17) and the transmission output shaft (10) to an electronic control device (3). The clutches (25, 26) are disconnected in the case of inadmissible speed ratios.

10 Claims, 1 Drawing Sheet

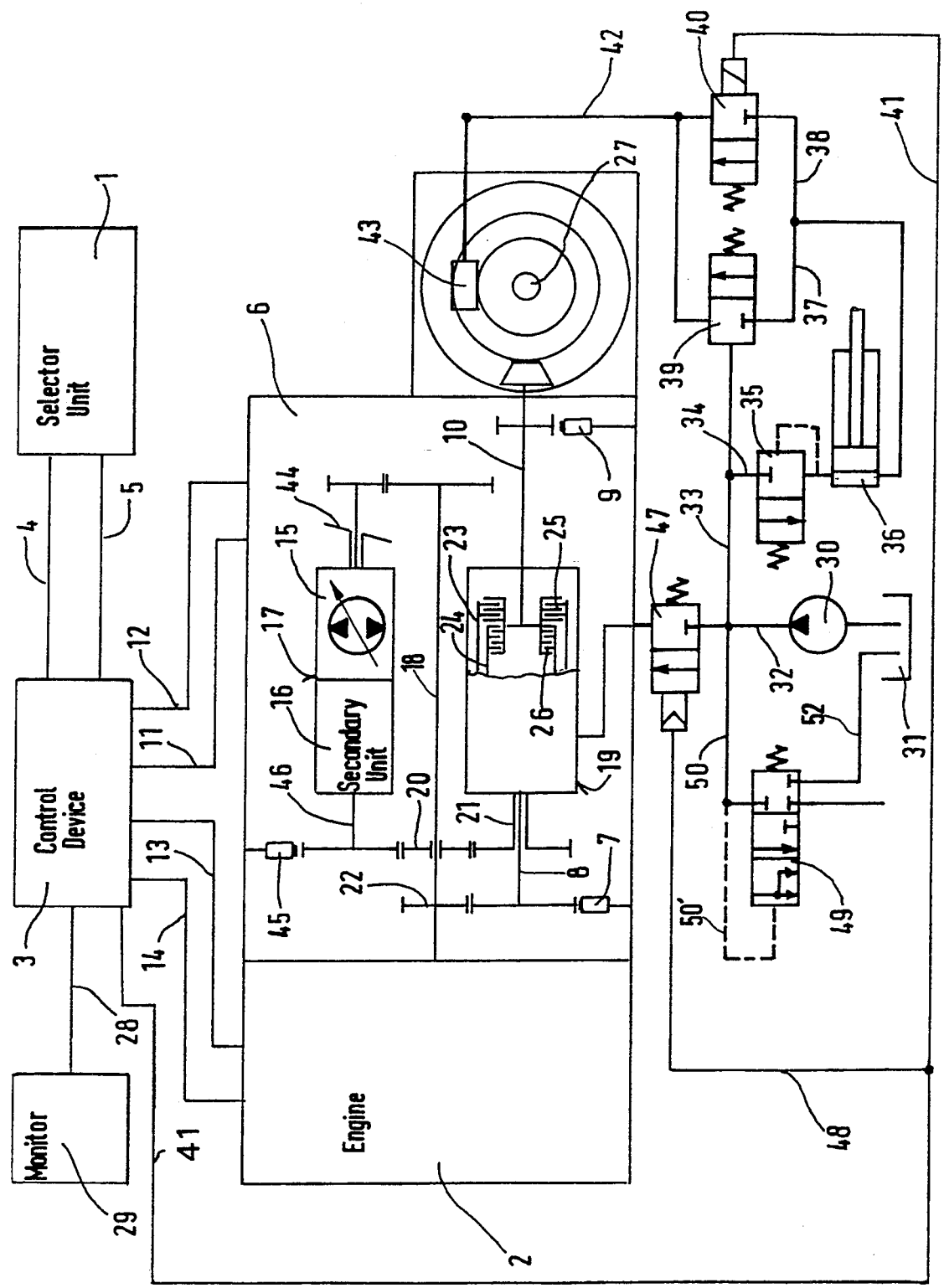

ARRANGEMENT AND PROCESS FOR OPERATING A FAIL SAFE BRAKING SYSTEM IN A CONTINUOUSLY VARIABLE DRIVING UNIT OF A MOTOR VEHICLE

The invention concerns a continuously variable driving unit for motor vehicles having the characteristics stated in the preamble of claim 1.

German Patent 35 12 523 has disclosed a continuously variable power-distribution combined powershift transmission with group gear changes. The transmission consists of two parts. One is a continuously variable power-distribution coupling transmission with several shafts. The other part is a selector transmission having a gear group and several group gears which act upon the main output shaft. Both coupling shafts alternatively drive the selector transmission. The gear selections take place at synchronization speeds free of load and without interrupting the tractive force. The transmission acts like a continuous transmission with large adjusting range and allows operation of the internal combustion machine in a vehicle along the curve for minimal consumption of fuel, thus making it possible to save fuel.

The continuously variable, power-distribution coupling transmission contains displacement machines which form a hydrostatic transmission. If the whole reduction ratio of the transmission is to be widened, either the hydrostatic transmission has to be enlarged or the number of gears in the selector transmission has to be increased. The first step leads to greater hydrostatic power flow and thus to poorer efficiency and more weight and required space due to the larger displacement machines. A fine graduation of the selector transmission due to the increased number of gears results in an accordingly higher number of clutches. The clutches can be, for instance, power shiftable, positive multi-disc clutches.

During a change of gear, the transmission output shaft is connected with another coupling shaft. Said change of gear takes place at a synchronous speed of the participating coupling shafts. The coupling shafts are connected via the multi-disc clutches with the output shaft of the transmission, an overlap in the clutch actuation appears during the change of gear in which a rigid reduction ratio exists between hydrostatic and mechanical transmission branches.

Relative speeds appear between the discs of power-transmitting clutches neither during regular operation within a selector range nor during a regular development of the change of gear. Even though a synchronous speed does not always very precisely exist during the change of gear, the speed differences between the clutches are so slight that almost no friction occurs when the clutches interlock.

The clutches are designed so that slippage of the clutch discs can be tolerated only very limitedly.

However, defective operation such as a drop in pressure in the actuating pistons of a clutch as result of wear, mechanical failure or lack of fluid can result in the engaging pressure of the clutch not being enough to transmit the torque to the transmission. The clutch then slips or—in case of lack of fluid—will no longer be engaged during a change of gear. Slippage would destroy the clutch discs within a short time such as about 2 min.

If a clutch cannot be engaged, the power train can be absolutely interrupted.

Defective operation of the clutches leads, therefore, to altogether very disadvantageous consequences for the drive of a motor vehicle.

The invention is based on the problem of providing an arrangement and a process which detect defective operation of a clutch, informs the driver, protects the clutch and ensures safe driving.

SUMMARY OF THE INVENTION

According to the invention this is obtained by the fact that a control device is connected with sensors for the speed of an input shaft of the coupling transmission and the speed of the output shaft of the transmission, and the control device actuates, in accordance with the ratio of said speeds, a monitoring device, multi-disc clutches and a brake.

With the arrangement according to the invention is obtained that the clutches be controlled by sensors which already exist for control of the transmission. Malfunction of one of the clutches will be indicated to the control device when the output shaft of the transmission arrives at a speed which, as a result of the reduction ratios in the hydrostatic power branch, the mechanical selector transmission, and the speeds of the output shaft of the hydrostat and/or of the internal combustion machine, is only possible when a clutch slips. By all clutches being immediately disengaged, excessive wear can be prevented. The driver is warned and the vehicle is automatically braked.

Electronic control devices have a specially favorable price-power ratio and make possible, in a particularly advantageous manner, the combination of the control operation according to the invention with travel programs.

According to the invention, hydraulically actuated clutches can perform the control operations with commercially available correction elements.

According to the invention, in case of an insufficient pressure build up of the supply pump for the actuation devices of the clutches, the rear axle is automatically braked.

According to the invention, a storage battery is provided which ensures, in case of a pressure loss, that sufficient pressure fluid is still available for actuating the brake.

According to the invention, the easy to detect speed of the internal combustion machine is used for forming the ratio.

According to the invention, a sensor measures the speed of the secondary unit of the hydrostatic branch and transmits it to the control device so that the slippage in the hydrostatic branch no longer has to be taken into account in evaluating the speed ratios.

The invention proposes processes by which defective operation of a clutch can be detected and shown or damaging effects can be prevented.

The invention describes a process for control of the operation of the clutches when changing over to a new travel range with a higher reduction ratio.

The invention describes a process for control of the change of gear which, when the clutches operate perfectly, again produces a torque-free initial condition.

The invention describes a process for control of the change of a gear which reduces the stress in the hydrostats.

The invention is not limited to the combination of features of the claims. Other logical possible combinations of the claims and individual features of the claims result for the expert according to the existing problem.

BRIEF DESCRIPTION OF THE DRAWINGS

Herebelow is explained in detail the arrangement according to the invention having reference to the drawing of the embodiment of a 2-range transmission.

DESCRIPTION OF THE PREFERRED EMBODIMENT(S)

In a selector switch 1, a freely selectable speed and an economy or a full-load program is set up to operate an internal combustion machine 2 at speeds having optimum consumption values or rated speed. A control device 3 exchanges electrical signals, such as a standard and a repeated signal, with the selector switch 1 through lines 4, 5. A continuously variable drive unit consists of the regulatable internal combustion machine 2 of a conventional construction which drives a hydrostatically mechanical power-distribution transmission 6. There is no engageable clutch between the internal combustion machine 2 and the power-distribution transmission 6. The control device 3 designed electronically, for instance, automatically controls the speed of the internal combustion machine 2 and the reduction ratio of the continuously variable hydrostatically mechanical power-distribution transmission 6 so as to obtain a preselected speed. A measuring value pickup 7, on a gear 8 of the input to the mechanical transmission branch driven at engine speed, and a measuring value pickup 9, on a transmission output shaft 10, transmit the shaft speeds over lines 11, 12 to the control device 3. The control device 3 compares the measured value speeds with the standards of the switch selector 1. Depending on the travel program stored in the control device 3, setting signals go from the control device 3, via the lines 13, 14, to the internal combustion machine 2 and the power-distribution transmission 6.

The internal combustion machine 2 is controlled in the usual manner by throttling the air-absorption cross section or the amount of fuel injection and is predominantly operated at a constant speed such a speed having low consumption values.

The reduction ratio of the hydrostatic mechanical power-distribution transmission 6 is continuously changed by the control device 3 steadily adjusting the flow volume of a primary unit 15 and thus the speed of a secondary unit 16 of a hydrostatic branch 17 of the power-distribution transmission 6. The primary unit 15 in the hydrostatic transmission branch 17 is directly driven via the input shaft 18 by the regulatable internal combustion machine 2 and rotates at a speed proportional to the speed of the internal combustion machine 2. The hydrostatic transmission branch 17 is connected with the mechanical transmission branch 19 via a gear 20 and a hollow shaft 21.

The internal combustion machine 2 drives, via gears 22 and 8, the mechanical transmission branch 19 which contains at least one coupling transmission (not shown). Coupling shafts 23, 24 of the coupling transmission are driven at continuously variable speeds resulting from the sum of the continuously variable speeds of the secondary unit 16 and of the constant speed of the shaft 8. Clutches 25, 26 optionally connect one of the coupling shafts 23 or 24 with the transmission output shaft 10 which drives a rear axle 27. During a change of gear, both coupling shafts 23 and 24 are jointly connected, at least for a short time, with the transmission output shaft 10 via the clutches 25, 26.

The control device 3 is connected via a line 28 with an acoustic and/or an optical monitoring device 29 in a driver's compartment (not shown) of the motor vehicle.

A pump 30 conveys pressurized fluid from a reservoir 31 through a pressure line 32 to hydraulic actuation devices (not shown) of the clutches 25, 26. A pressure line 33 branches off from the pressure line 32. Another pressure line 34 branches off from the pressure line 33 which contains a recoil valve 35 and an accumulator 36. The pressure line 34 discharges in two pressure lines 37, 38 engaged in parallel. The pressure line 37 contains a spring-prestressed 3/2 directional valve 39 which is kept in closed position by the pressure in the line 33. The pressure line 38 contains a spring-prestressed 3/2 directional valve 40 which is kept closed by the circuit current of the electrical network of the motor vehicle. The 3/2 directional valves 39, 40 are connected with the control device 3 via an electric line 41.

The pressure lines 37, 38 join in a pressure line 42, which discharges in the actuation device of a disc brake 43. The disc brake 43 acts upon the rear axle 27 and can be identical with the operation brake.

The line 32 contains a 3/2 directional valve 47 electrically controlled by the control device 3 via lines 41, 48. The valve 47 is opened in case of adjacent circuit current. A line 50 branches off from the line 32 which leads to a 4/3 directional valve. The valve 49 is controlled by the pressure in the line 32 and has connections for lubrication 51 and return flow 52.

Mode of operation:

a) Perfect operation:

The engaged clutch 25 or 26 transmits without slippage 100% the speed of the engaged coupling shaft 23 or 24 to the output shaft 10 of the transmission 6.

A sensor 7 communicates the speed of the internal combustion engine 2 to the control device 3. The position of the swash plate 44 of the primary unit 15 and the engaged reduction ratio of the mechanical transmission 19 are further stored in the control device 3. When the hydrostatic transmission branch 17 operates without leakage, it can already be calculated from these parameters what speed the sensor 9 should transmit from the output shaft 10 of the transmission to the control device 3. Operation without leakage of the hydrostats 15, 16 is only possible in an ideal load-free operation. Therefore, in an especially advantageous design of the arrangement according to the invention, a sensor 45 is provided which transmits the speed of the output shaft 46 of the secondary unit 16 to the control device 3. Ratio deviations of the transmission 6 due to hydrostat losses have already been taken into account in the measured value of the sensor 45.

The valve 47 is opened and the pump 30 conveys pressurized fluid to the pistons of the clutches 25 and 26 and into the pressure line 33 and fills an accumulator 36 in the pressure line 34. The pressure in the line 33 keeps the 3/2 directional valve 39 of the line 37 closed as long as the pressure in the line 32 suffices to engage one of the clutches 25, 26.

The pressure in the line 32 controls the 4/3 directional valve 49 via the lines 50, 50'. The lubrication 51 is also supplied when there is sufficient pressure. When the pressure is elevated the connection 52 to the return flow is free.

b) Defective operation:

If the pressure in the line 32 drops below a preset value in the 3/2 directional valve 39, for instance, as result of pump wear or lack of pressurized fluid, the valve 39 opens automatically by spring tension and pressurized fluid flows through the lines 37 and 42 with a pressure level guaranteed by the accumulator 36 and actuates the brake 43 so that the vehicle slowly stops. The opening of the 3/2 directional valve 39 is indicated in the control device 3 which closes the valve 47. The engaged clutch 25, 26 becomes pressureless and the driver is informed, via the display 29, that an interruption in operation exists.

Despite sufficient pressure in the line 32, slippage in the engaged clutch 25 or 26 can be possible as result of an interruption in the actuation device of the clutches 25, 26 such as clamping of a piston.

The constant comparison of the speed measured on the output shaft 10 of the transmission by means of the sensor 9 with the speed of the internal combustion machine 2 and also subsidiarily the speed of the output shaft 46 of the secondary unit 16, with performance graphs previously known in the control device 3, leads to immediate discovery of a slipping clutch. The control device 3 immediately causes the issuance of a warning on the display 29, makes all of the actuation devices of the clutches 25, 26 pressureless by closing the valve 47 and gives a control signal to open the 3/2 directional valve 40. Pressurized fluid flows from the line 32 through the lines 33, 34, 38, 42 and actuates the brake 43.

c) Monitoring of the gear change operations:

After engaging the clutch of a new reduction ratio but before releasing the clutch of the prior reduction ratio, that is, while the transmission branches 17, 19 rotate as a rigid unit when the clutches 25, 26 are regularly engaged, a signal issues from the control device 3 to adjust the swash plate 44 of the primary unit. If one of the two clutches 25, 26 slips or does not engage at all, then the ratio of the speeds of the output shaft 10 of the transmission 6 and of an input shaft 8, 46 of the coupling transmission changes during the change of gear as result of a changed angle of the swash plate 44 of the primary unit 15. The control device 3 gives a warning via the display 29, sets all of the clutches 25, 26 free of pressure by closing the valve 47 and opens the 3/2 directional valve 40 so that the brake 43 is actuated.

If the ratio of the speeds does not change during the change of gear as a result of a changed angle of the swash plate 44 of the primary unit 15, the control device 3 again adjusts the original angle and disengages the clutch of the prior reduction ratio.

In the case of a failure of voltage in the electric network 41, 48 of the motor vehicle, the 3/2 directional valve 40 likewise opens so that at least the braking is further ensured by the accumulator 36 and the vehicle stops safely.

Reference numerals

1—selector switch
2—internal combustion machine
3—control device
4—line
5—line
6—transmission
7—sensor
8—gear
9—sensor
10—output shaft
11—line
12—line
13—line
14—line
15—primary unit
16—secondary unit
17—hydrostatic transmission
18—input shaft
19—mechanical transmission branch
20—gear
21—hollow shaft
22—gear
23—coupling shaft
24—coupling shaft
25—clutch
26—clutch
27—rear axle
28—line
29—display/monitoring device
30—pump
31—reservoir
32—pressure line
33—pressure line
34—pressure line
35—recoil valve
36—accumulator
37—pressure line
38—pressure line
39—3/2 directional valve mechanical
40—3/2 directional valve electrical
41—control and flow line
42—pressure line
43—brake
44—swash plate
45—sensor
46—output shaft secondary unit
47—3/2 directional valve
48—electric control line
49—4/3 directional valve
50—pressure line
51—lubrication line
52—return flow

We claim:

1. An arrangement for operating a continuously variable drive unit of a motor vehicle comprising:

a regulatable internal combustion engine (2);

a hydrostatic mechanical power-distribution transmission (6), with a continuously variable gear ratio, having a rotatable input shaft (18), connected to the engine, and a rotatable output shaft (10), a mechanical branch (19) of the hydrostatic mechanical power-distribution transmission (6) being at least driven by said input shaft and having a plurality of gear ratios and a plurality of hydraulically actuated multi-disc clutches, a hydrostatic branch (17) of the hydrostatic mechanical power-distribution transmission (6) having a primary unit (15) connected to said input shaft and a secondary unit (16) for a continuous change of a gear ratio, said secondary unit (16) being connected to said mechanical branch (19), at least two coupling shafts (23, 24) each being connectable with the output shaft (10) of said transmission (6) via one of said plurality of hydraulically actuated multi-disc clutches (25, 26), and each of said at least two coupling shafts being coordinated with a gear ratio of said mechanical branch, wherein a control device is connected with an input shaft sensor for sensing the speed of said input shaft and with an output shaft sensor for sensing the speed of said output shaft, and said control device (3) actuates a monitoring device (29), said plurality of multi-disc clutches (25, 26) and a brake of the motorvehicle (43) in accordance with the ratio of said sensed speeds, a pump (30) conveys pressurized fluid to actuation devices for said multi-disc clutches (25, 26) via a first line (32), a second line (33) branches off from said first line (32) and a third line (34) branches off from said second line (33), said third line (34) divides into parallel fourth and fifth lines (37, 38), and a sixth line (42) connects an actuation device of said brake (43) with said fourth and fifth lines (37, 38), said fourth line (37) contains a value (39), control by pressure in said second line (33), which controls the flow of pressurized fluid through said fourth line (37), and an electrically actuated valve (40), connected with the control device (3), controls the flow of pressurized fluid through said fifth line (38).

2. An arrangement for operating a continuously variable drive unit of a motor vehicle according to claim 1, wherein said third line (34) has, sequential arrange therealong, a coil valve (35) and a spring-loaded accumulator (36) for receiving and storing the pressurized fluid.

3. An arrangement for operating a continuously variable drive unit of a motor vehicle according to claim 1, wherein a drive sensor (7) senses the speed of said drive unit and transmits the sensed value to said control device (3).

4. An arrangement for operating a continuously variable drive unit of a motor vehicle according to claim 1, wherein a secondary unit sensor (45) sense the speed of an output shaft of said secondary unit (16) and transmits the sensed value to said control device (3).

5. An arrangement for operating a continuously variable drive unit of a motor vehicle according to claim 1, wherein each of said plurality of hydraulically actuated multi-disc clutches (25, 26), when engaged, engages a said coupling shaft (23, 24) with said output shaft (10).

6. A process, for operating a continuously variable drive unit of a motor vehicle, comprising:
a regulatable internal combustion engine (2);
a hydrostatic mechanical power-distribution transmission (6), with a continuously variable gear ratio, having a rotatable input shaft (18), connected to the engine, and a rotatable output shaft (10),
a mechanical branch (19) of the hydrostatic mechanical power-distribution transmission (6) being at least driven by said input shaft and having a plurality of gear ratios and a plurality of hydraulically actuated multi-disc clutches,
a hydrostatic branch (17) of the hydrostatic mechanical power-distribution transmission (6) having a primary unit (15) connected to said input shaft and a secondary unit (16) for a continuous change of a gear ratio, said secondary unit (16) being connected to said mechanical branch (19),
at least two coupling shafts (23, 24) each being connectable with the output shaft (10) of said transmission (6) via one of said plurality of hydraulically actuated multi-disc clutches (25, 26) a pump, a first line for hydraulic fluid, and each of said at least two coupling shafts being coordinated with a gear ratio of said mechanical branch,
wherein a control device is connected with an input shaft sensor for sensing the speed of said input shaft and with an output shaft sensor for sensing the speed of said output shaft, and said control device (3) actuates a motoring device (29), said plurality of multi-disc clutches (25, 26) and a brake of the motorvehicle (43) in accordance with the ratio of said second speeds, said process comprising the steps of:
sensing the speed of at least one of the input shaft of said transmission and the output shaft of said transmission;
comparing a ratio of said sensed speeds with a predetermined ratio;
producing a warning signal when a predetermined deviation occurs between the ratio of said sensed speed and the predetermined ratio; and
disengaging said multi-disc clutches and engaging a brake to stop said motor vehicle when said predetermined deviation occurs.

7. A process according to claim 5, further comprising the step of:
engaging said brake when a fluid pressure in said first line for actuating said hydraulically actuated multi-disc clutches falls below a predetermined pressure.

8. A process according to claim 6, further comprising the steps of:
connecting, with a first clutch, said output shaft of said transmission with a coupling shaft of a desired gear ratio;
engaging, with a second clutch a coupling shaft of a next gear ratio, at a synchronous speed free of load and without interrupting a tractive force of said output shaft of said transmission;
adjusting a swash plate of said primary unit; and
disengaging said first clutch when a change of speed of said output shaft of said transmission is sensed.

9. A process according to claim 7, further comprising the step of:
canceling the adjustment of said swash plate when a sensed speed of said output shaft of said transmission has not changed.

10. A process according to claim 7, further comprising the step of:
adjusting said swash plate to minimize said deviation between said sensed speed and said predetermined ratio.

* * * * *